May 23, 1933.  E. D. KASER  1,910,550
GROUP CONTROL MEANS FOR LOCKERS
Filed March 5, 1931   5 Sheets-Sheet 1
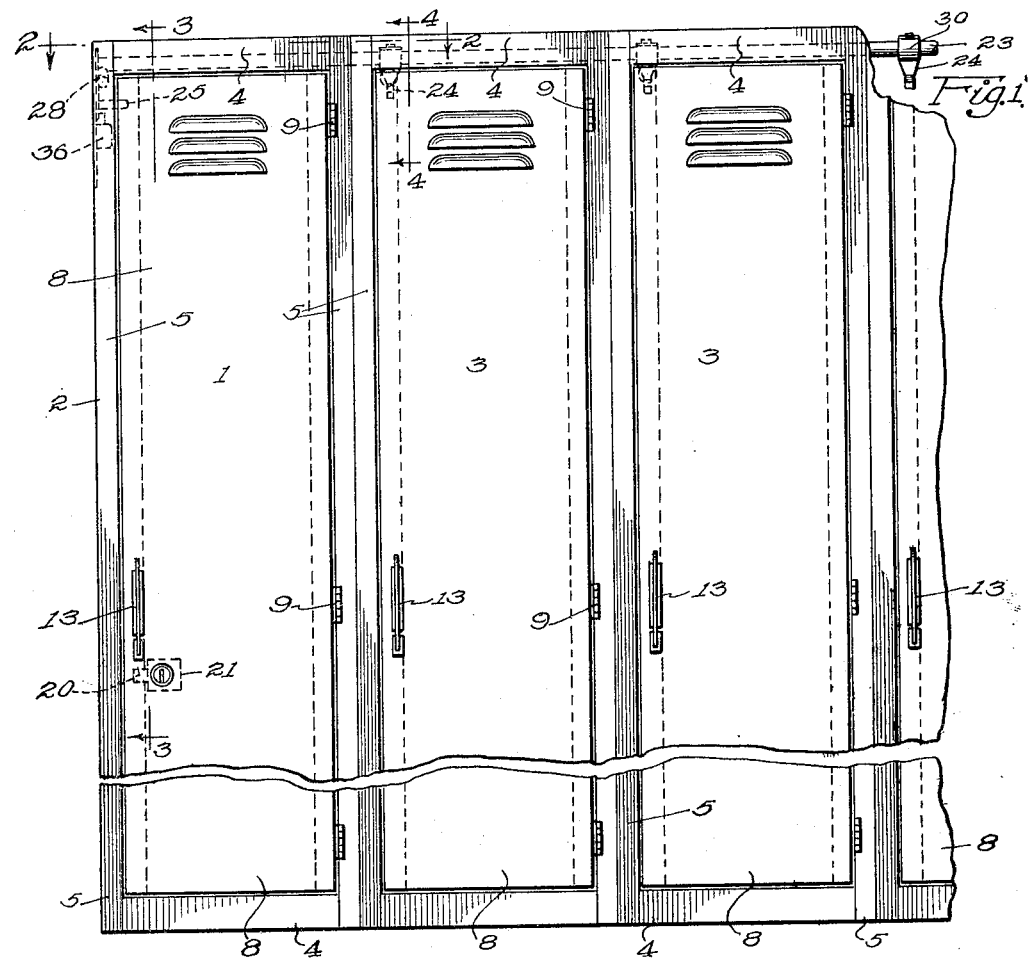
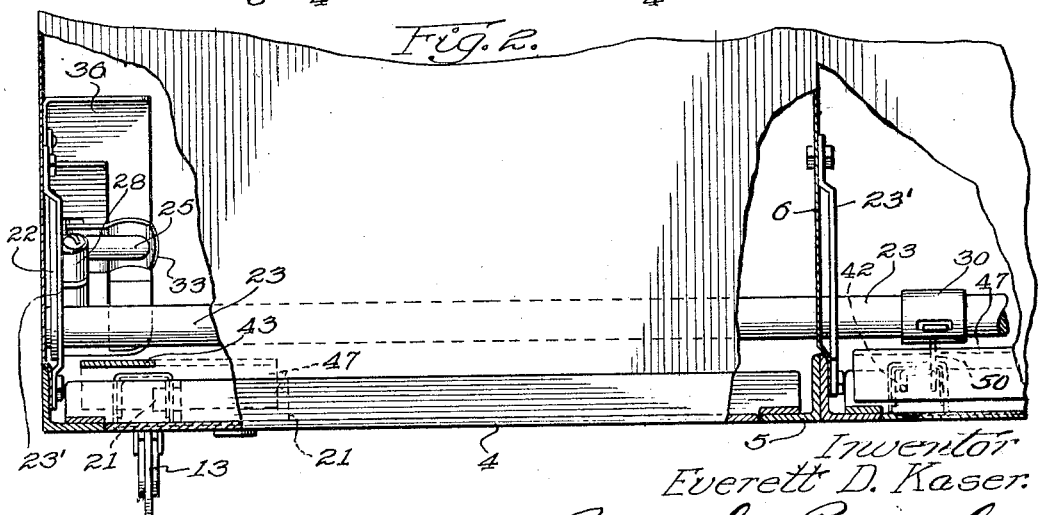

May 23, 1933.  E. D. KASER  1,910,550
GROUP CONTROL MEANS FOR LOCKERS
Filed March 5, 1931  5 Sheets-Sheet 2
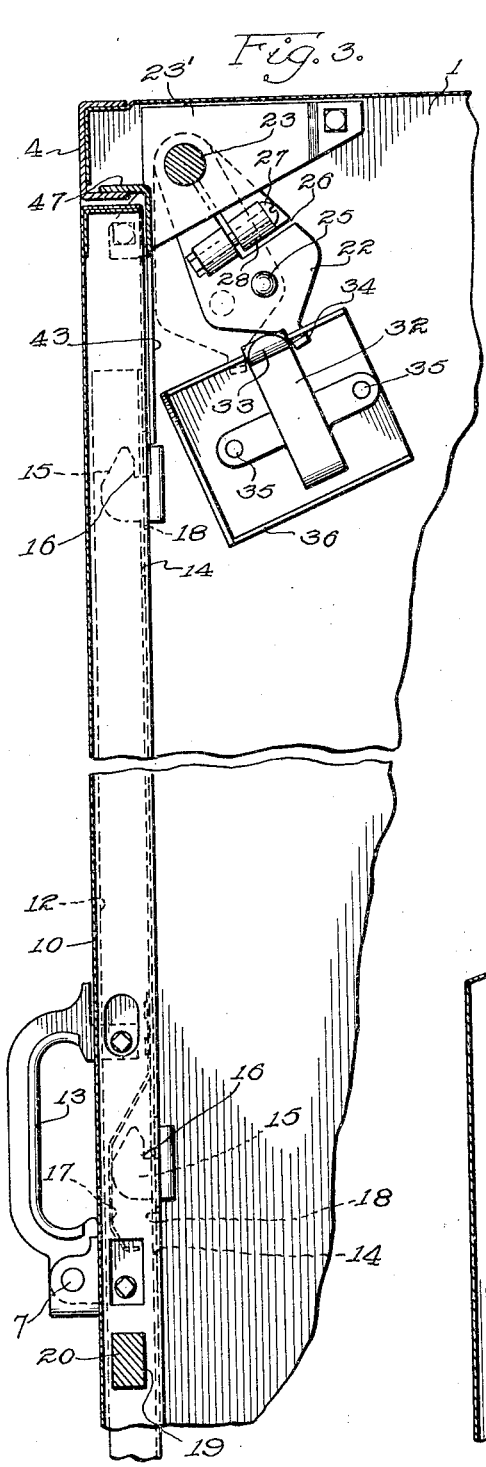
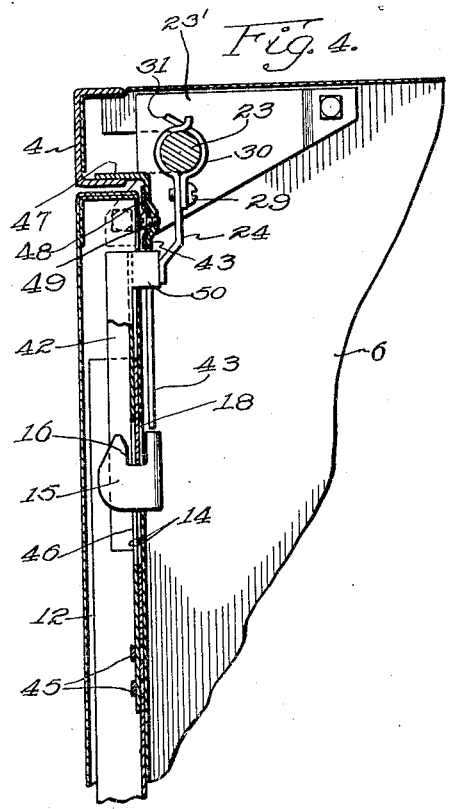
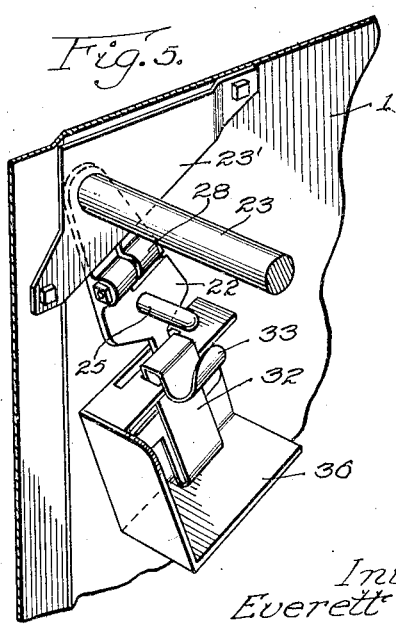
Witness
Arthur M. Franke.
Inventor
Everett D. Kaser
Rummler, Rummler
& Woodworth Attys:

May 23, 1933.  E. D. KASER  1,910,550
GROUP CONTROL MEANS FOR LOCKERS
Filed March 5, 1931   5 Sheets-Sheet 3
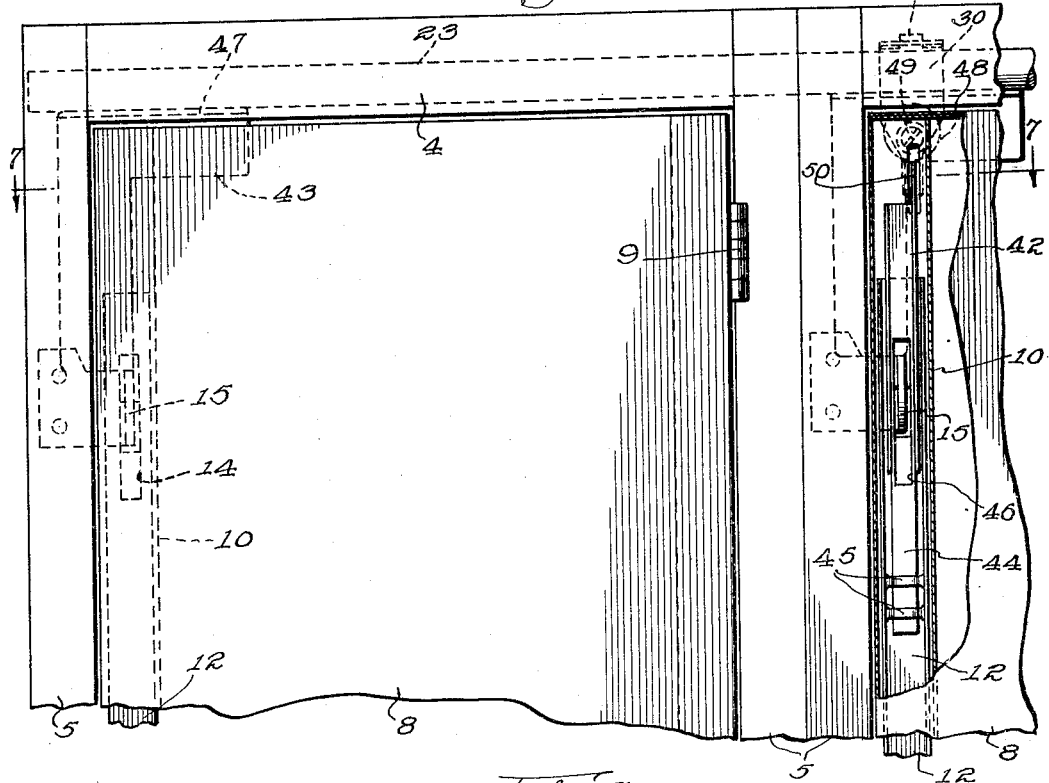
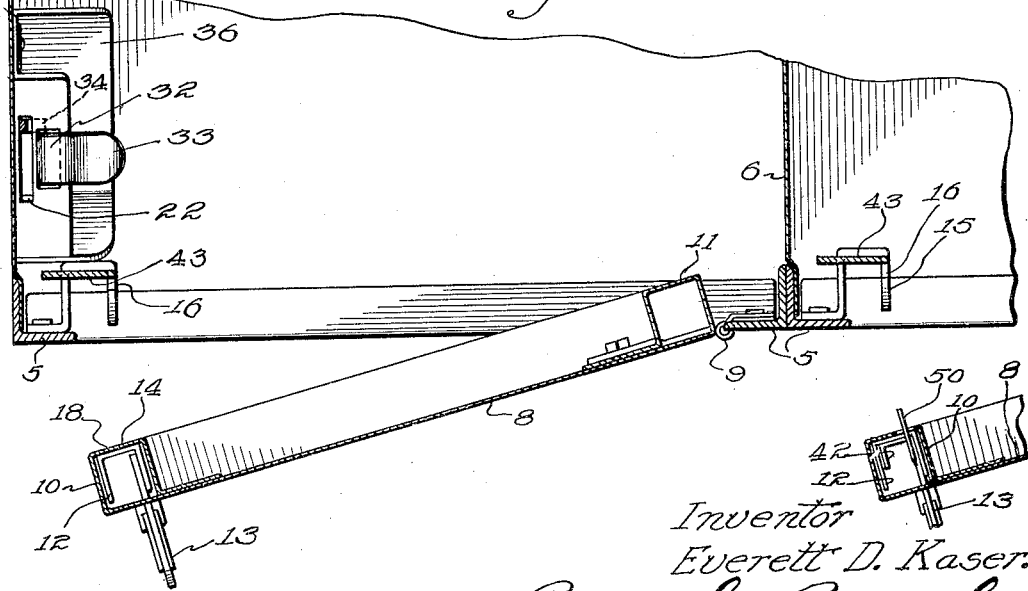
Inventor
Everett D. Kaser.
Witness
Arthur M. Franke.

May 23, 1933.   E. D. KASER   1,910,550
GROUP CONTROL MEANS FOR LOCKERS
Filed March 5, 1931   5 Sheets-Sheet 4
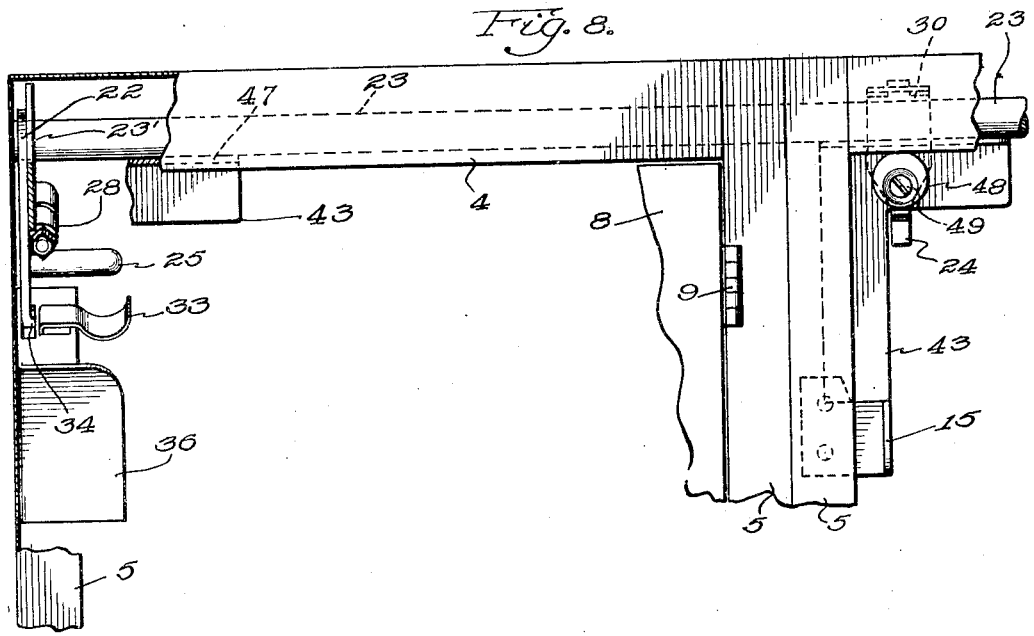
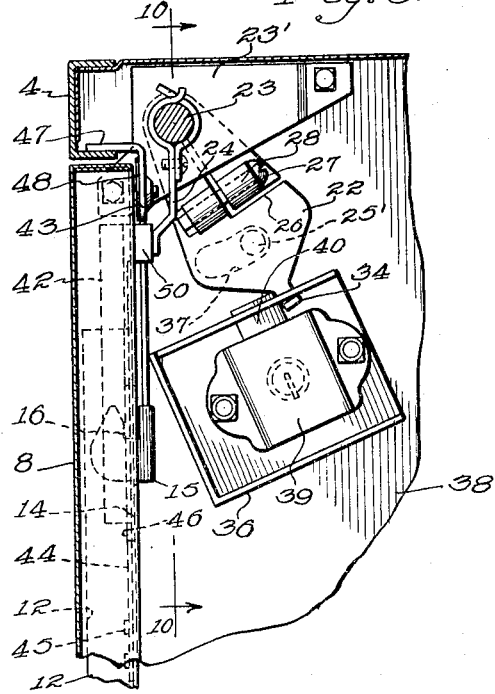
Witness
Arthur M. Franke.
Inventor
Everett D. Kaser.
Rummler, Rummler
&
Woodworth   Attys.

May 23, 1933.  E. D. KASER  1,910,550
GROUP CONTROL MEANS FOR LOCKERS
Filed March 5, 1931  5 Sheets-Sheet 5

Witness
Arthur M. Franke.

Inventor
Everett D. Kaser.
Rummler, Rummler
& Woodworth Attys.

Patented May 23, 1933

1,910,550

UNITED STATES PATENT OFFICE

EVERETT D. KASER, OF AURORA, ILLINOIS, ASSIGNOR TO DURABILT STEEL LOCKER CO., OF AURORA, ILLINOIS, A CORPORATION OF ILLINOIS

GROUP CONTROL MEANS FOR LOCKERS

Application filed March 5, 1931. Serial No. 520,305.

This invention relates to a multiple unit locker construction wherein a plurality of lockers, each having individual doors, are provided with a common means for controlling the locking and unlocking of the doors, and is designed particularly for use in schools. It is frequently desirable, particularly for the younger children, to provide locker constructions in which the doors may be opened at predetermined times without the necessity of each child using a key or working a combination lock.

The object of the invention is to provide improvements in such constructions wherein a single master locking means, preferably located at one of the lockers, controls the release of all doors in a group of lockers.

The object of the invention is attained by means of a construction as illustrated in the drawings, wherein:

Fig. 1 is a front view, partly broken away, of a series of lockers provided with the improved controlling means.

Fig. 2 is an enlarged fragmentary plan view of the lockers, partly in section, taken on the line 2—2 of Fig. 1.

Fig. 3 is an enlarged fragmentary sectional elevation taken on the line 3—3 of Fig. 1.

Fig. 4 is a sectional detail taken on the line 4—4 of Fig. 1.

Fig. 5 is a detail in perspective and partly in section to illustrate controlling and operating means for the rocker shaft which controls the latch bars for a series of lockers.

Fig. 6 is an enlarged fragmentary face view partly in section to illustrate the arrangement of resilient extensions of the latch bars.

Fig. 7 is a fragmentary sectional detail taken on the line 7—7 of Fig. 6, but shows the locker doors in partly open position. The detached portion of the figure indicates a portion of the door of the second locker.

Fig. 8 is a fragmentary face view partly in section of the construction shown in Fig. 7.

Fig. 9 is a sectional detail illustrating a modification.

Fig. 10 is a sectional view taken on the line 10—10 of Fig. 9.

Figure 11:
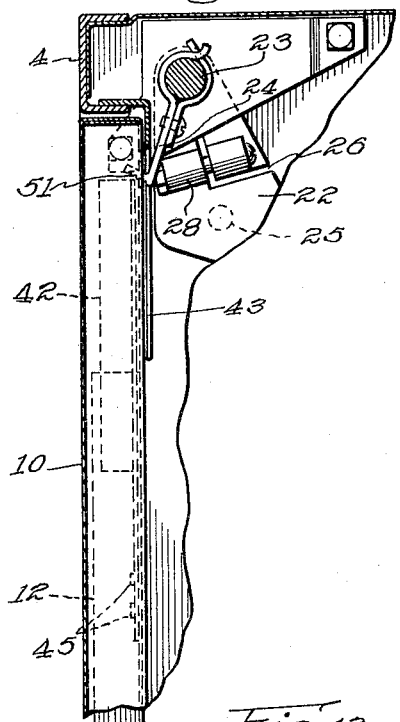
Figs. 11, 12, 13 and 14 are sectional details to illustrate various modified arrangements of coacting elements between locker door latch bars and the controlling rocker shaft.

The mechanism employed for carrying out the purposes of this invention is mounted in a rectangular cabinet construction divided by partition walls into a plurality of separate compartments. A hinged door is provided for each compartment, and each door carries a vertically reciprocable latching bar for coacting with fixed latching elements mounted within the cabinet.

The patent to Everett D. Kaser, on Locker latches, No. 1,774,330, dated August 26, 1930, relates to latching bar constructions in some respects similar to the one utilized in the construction herein illustrated and described.

In the present case, these latching bars, if it is desired, may be individually locked in addition to locking by the common control and locking means now provided. The control means includes a horizontally extending rocker shaft mounted in the upper part of the cabinet and extending through a series of lockers. This control shaft carries arms, one in each locker, in position to cooperate with the latching bar for such locker, so that the latching bar, by means of a resilient extension thereof, may be set in condition for operation in an unlocking direction.

The oscillation of the rocker shaft for adjusting the individual latching bars for the separate compartments to permit releasing motion of such latching bars, is under the control of means located at only one of the lockers for which a separate locking means is provided.

Referring to the drawings, the master locker 1 may be located at one end of a cabinet 2 which also provides a series of additional lockers 3. The necessary structural strength is provided for cabinet 2 by channel and angle bars 4 and 5. The cabinet is divided into a plurality of locker compartments by partitions 6, the forward ends of which are attached to vertical angle bars 5. The doors 8 are hinged to the bars 5 at 9.

The material from which each door is formed is bent at its inner and outer edges into square tubular form as indicated at 10 and 11 in Fig. 7, and is welded to the inner face of the door. The bent part 10 of each door provides a guideway within which is slidably mounted a latching bar 12, U-shaped in cross section and having a handle 13 projecting forwardly through a slot in the door. One of these vertically reciprocal latching bars is mounted in each door, and each bar is slotted at 14, Fig. 3, to receive coacting latching elements 15, which are fixed to an angle bar 5 of each locker. Any one of the latching bars may be padlocked at 7.

When one of the latching bars 12 is slid upwardly by means of its handle 13, it is disengaged from the latching fingers 15, these latching fingers being recessed at 16 to interlock with the bars 12 at the upper edges of recess 14. When the latching bar is lifted, the door upon which it is mounted may be swung to its open position. The latching bar is then retained in its upper position by a spring 17, carried thereby, which swings into and bears upon the lower edge of a slot 18 in the bent end portion 10 of the door. When the door is swung to its closed position, the spring 17 is disengaged from the lower edge of the slot 18 by engagement with the latching finger 15, and the latch bar 12 may then be lowered to latch the door shut. The latching bar 12 for the master locker door is cut out at 19, Fig. 3, to receive the bolt 20 of a key-controlled lock 21, Fig. 1, for this locker. Therefore, in order to lift the latching bar of the master locker to release the door, it is necessary to operate lock 21.

In the form of the invention illustrated by Figs. 1 to 7 inclusive, access may be had to the main locker control lever 22, shown in Figures 3 and 5, through the door of the master locker 1. The control lever 22 is secured to a rocker shaft 23, and through the rotation of this shaft by means of the lever 22, the release members 24, secured to the rocker-shaft 23, as shown in Fig. 4, are adjusted to release the latch bars 12 of the lockers 3.

The lever 22 is provided with a handle 25 for convenience in adjusting the lever. The lever 22 has an L-shaped cut 26 therein, so that it may be tightly clamped to the rocker shaft 23 by means of screw 27 passing through ears 28 formed, or welded, upon the lever at opposite sides of the cut. The arms or release members 24 are also clamped tightly to the rocker shaft 23, Fig. 4, by screw 29 passing through a clamping element 30 carried by arm 24 and having its end 31 hooked into an aperture in the end of the arm.

The rocker shaft 23 is supported in bearing members 23', secured to the end and partition walls of the cabinet. The operating lever 22 for the rocker shaft is shiftable between the full line and broken line positions shown in Fig. 3. It is retained in either one of these positions by spring retainer 32, Figs. 3 and 5. The retainer may be drawn forwardly by means of a grip 33 thereof, clear of the forwardly bent lug 34 on the arm 22. Retainer 32 as shown in Figs. 3 and 5, may be a spring element attached by rivets 35 to a support 36 secured to the end wall of the master locker 1.

A modification of this common control means for all of the lockers is illustrated in Figs. 9 and 10, wherein the handle 25' of the operating lever 22 projects from the opposite side thereof from that shown in the remaining figures, and passes through an arcuate slot 37 in the end side wall 38 of the master locker so that the control means may be accessible from the outside. In this case the support 36 carries a lock 39, the bolt 40 of which takes the place of the resilient retainer 32. The bolt may be withdrawn from the path of movement of the lug 34 on the arm 22 by inserting a key from the outside of wall 38. Thus, when the bolt is drawn into the lock 39, the rocker shaft 23 may be operated to release the latching bars of all the lockers in the group, including the master locker, which in this case is also provided with one of the releasing arms 24 for shifting a resilient member 42 attached to the upper end of the latching bar, outwardly, clear of a stop 43. The resilient element 42 attached to the upper end of each of the latching bars 12 is U-shaped in cross-section, except at its lower end 44, which affords the required resiliency to allow this member to be rocked around its point of attachment 45 to the latching bar 12, as may be seen in Figs. 4 and 9, the same construction being used in connection with the group of lockers 3. The member 42 is slotted at 46 to clear the retainer 15.

A stop element 43 is provided for each latching bar and is L-shaped, as shown in Fig. 9, to extend over the inner corner edge of a door, preventing access, to the control arm 22 or the spring retaining element 32 therefor, in the case of the master locker, or the releasing means for the lockers 3. It is provided with a flange 47 at its upper edge by means of which it is attached by welding to the channel frame member 4 of the cabinet. A washer 48, eccentrically apertured, is secured to the stop member 43 by a screw 49. This washer is countersunk around the screw and fits the countersunk part of the stop element so that it may be firmly clamped thereto in any angular position around the screw. Its purpose is to provide an adjustable engaging surface for the upper edge of the resilient element 42 at the top of latch bar 12.

The members 42 on the upper ends of the latch bars are provided with inwardly bent lugs 50, Fig. 4, for coaction with the stop members 43, and also for coaction of the lower ends of arms 24. This arrangement is shown variously modified by Figs. 11 to 14, inclusive. In Fig. 11, the member 42 does not have such a projecting lug, but the arm 24 is provided with a notched bent end 51 extending over the upper edge of the member 42. When it is swung to the right, Fig. 11, it clears the member 42 and allows the latching bar 12 to be shifted upwardly to releasing position. Such arrangement requires an opposite oscillation of the shaft 23, from that required in the arrangement as shown in Fig. 3, for the purpose of releasing the latch bars, but it does not involve any change in the arrangement of spring retainer 32 for the control arm 22 or of the lock 39, Fig. 9.

Figure 12:
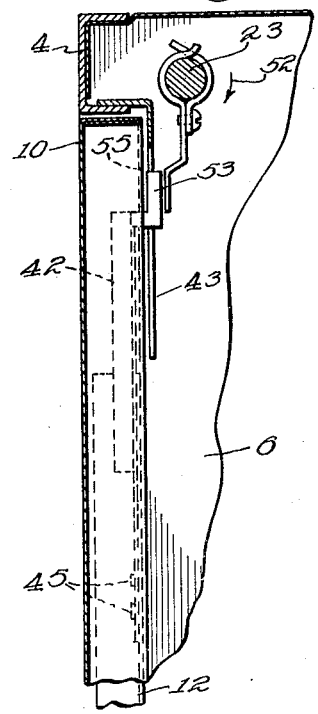

The modified construction shown by Fig. 12, is in its unlocked position. When shifted to its locked position, in the direction indicated by arrow 52, the upper projecting lug 53 on the resilient member 42 is shifted beneath a stop shoulder 55 formed by slotting the guideway 10 of the door structure, to permit the upper end of the resilient member 42 to project therethrough.

Figure 13:
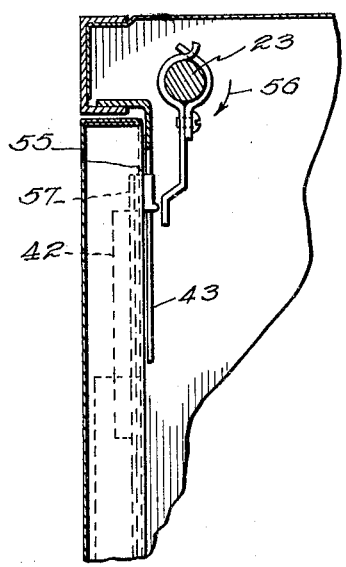

Another variation of this construction is shown by Fig. 13 where, when the rocker shaft 23 is rocked in the direction indicated by arrow 56, the upper end 57 of the resilient member 42 is shifted outwardly clear of the abutment 55.

Figure 14:
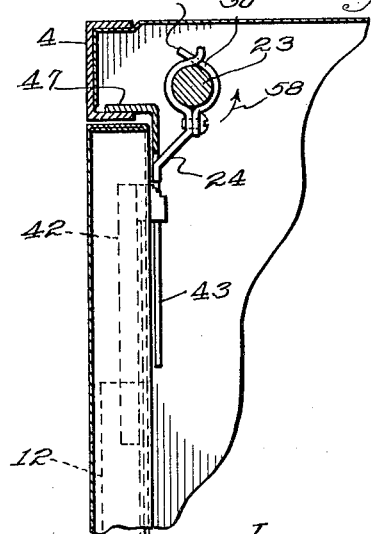

In the form shown in Fig. 14, the upper notched end of the member 42 coacts with the lower end of arm 24, which in this case serves as a stop. By rocking the shaft 23 in the direction indicated by the arrow 58, the arm 24 is moved out of the way of member 42, and the latch bar 12 is then free to move upwardly into the releasing position.

In the operation of the construction illustrated by Figs. 1 to 8 inclusive, in order to release all of the locker doors, it is necessary to unlock the door for master locker 1 at lock 21, and lift the latching bar by handle 73 to open this door. Then by drawing the retaining spring 32 outwardly and rocking the lever 22 by means of handle 25, from the full line position to the broken line position, Fig. 3, the rocker shaft is rotated the required extent to cause arms 24 to rock the resilient retaining elements 42 clear of stops 43. Then, any one of the latch bars 12 for lockers 3 may be raised clear of the coacting lock elements 15 by means of the handles 13 on the lock bars.

In the construction illustrated by Figs. 9 and 10, the rocker shaft 23 may be operated in the same manner by handle 25′ from the outside of the cabinet after the locking bolt 40 is withdrawn by means of a key inserted in lock 39 from the outside of the cabinet. Either method of operation is applicable to the forms of construction illustrated by Figs. 11 to 14.

It will be understood that details of the constructions illustrated, may be altered or omitted without departing from the invention as defined by the following claims.

I claim:

1. A cabinet and partition walls forming a plurality of adjacent lockers, doors for each of said lockers, each of said doors being provided with a vertical reciprocal latching bar, fixed locking means mounted on the cabinet for coacting with said latching bars, means for obstructing the motion of said latching bars, resilient elements on said latching bars for engaging said obstructing means, a rocker shaft mounted in the cabinet to extend across the upper ends of each of the locker compartments and carrying arms for shifting the resilient elements on the latching bars, and means for operating said rocker shaft located at one of said lockers.

2. A multiple locker construction comprising a cabinet forming a plurality of adjacent lockers, doors for said lockers, latching bars mounted for reciprocation in each door and having a handle projecting therethrough, locking elements secured to the cabinet structure and coacting with said latching bars, a lock controlling the operation of one of said bars whereby one of said doors only may be opened under the control of the lock, means within the cabinet accessible through said one door for simultaneously controlling the latching bars for the remaining doors, said means consisting of a rocker shaft extending through the various compartments of the cabinet and having arms fixed thereon, and resilient stop elements carried by the latch bars and under the control of said arms.

3. A cabinet including partitions forming a multiple locker construction, doors for the lockers, a manually adjustable latching bar for each door, a fixed stop for each of said latching bars, resilient elements on the latching bars for coacting with said fixed stops, and a shaft adjustably mounted within said cabinet and arranged to engage said resilient elements on the latch bars and disengage the resilient elements from the fixed stops.

4. A cabinet including partitions forming a multiple locker construction, doors for the lockers, a manually adjustable latching bar for each door, a fixed stop for each of said latching bars, resilient elements on the latching bars for coacting with said fixed stops, a shaft adjustably mounted within said cabinet and arranged to engage said resilient elements on the latch bars and disengage the resilient elements from the fixed stops, said fixed stops including adjustable eccentric elements for varying the space between said stops and the resilient elements.

Signed a Aurora, Illinois, this second day of March, 1931.

EVERETT D. KASER.